April 14, 1931. L. BRADLEY 1,800,856
TREATING IRON ORE
Filed April 7, 1926
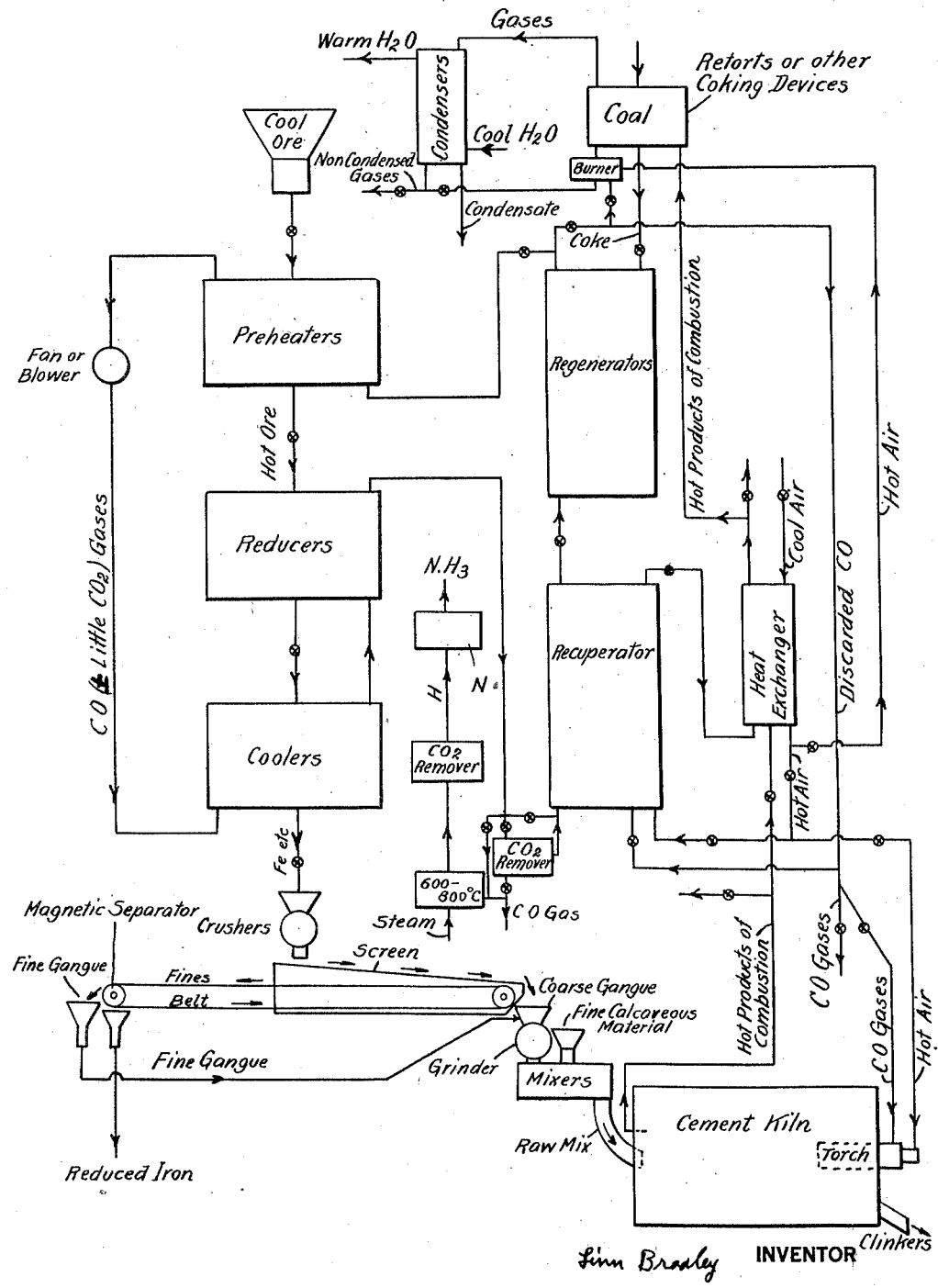

Patented Apr. 14, 1931

1,800,856

UNITED STATES PATENT OFFICE

LINN BRADLEY, OF MONTCLAIR, NEW JERSEY

TREATING IRON ORE

Application filed April 7, 1926. Serial No. 100,458.

This invention relates to the reduction of iron oxide, e. g. in the form of finely divided iron ore, by means of a suitable reducing gas, e. g. carbon monoxide, at a temperature suitable for effecting such reduction but below the fusing point of the iron, the necessary heat energy being supplied in a manner which has some advantageous features. The invention also relates to the production of gases containing carbon monoxide, and to the destructive distillation of carbonaceous fuels such as bituminous coal, wood, etc. The invention also relates to the production of hydraulic cement and particularly to the simultaneous and interdependent production of cement and reduced iron.

Among the objects of the invention are the utilization of certain types of iron ores which are not ordinarily considered suitable in their natural condition for charging into blast furnaces; the production of iron of good quality; the utilization of materials associated with the iron in the iron ore; the reduction of iron oxide without fusing the iron produced, facilitating separating of the iron from other materials by magnetic means; the reduction step to be carried out by an exothermic reaction between the reducing gas and the iron oxide, so as to facilitate the operations; the regeneration of the reducing gas by conversion of carbon dioxide into carbon monoxide by reaction between carbon dioxide and carbon at suitable temperature; the utilization of reducing agent to good advantage; and other objects and advantages which will appear from the following more detailed description of the invention.

In this invention, suitable iron oxide is preheated to a suitable temperature for the following step or steps, it is then reduced to iron by means of carbon monoxide gas supplied from any suitable source at a suitable temperature to permit the reduction step being carried out to the desired degree without supplying additional heat other than the sensible heats of the materials and the heat energy of the exothermic reactions; the resulting gases which contain some carbon dioxide are then regenerated to again obtain a suitable reducing gas which contains the required amount of carbon monoxide and adapted by temperature and composition to serve in reducing some more iron oxide by an exothermic reaction; and the process is repeated and becomes cyclic insofar as the gas first consists essentially of carbon monoxide, then the reduction step is carried out to yield a mixture of carbon monoxide and carbon dioxide and this mixture is regenerated so as to convert some of the carbon dioxide into carbon monoxide by reaction with heated carbon, to yield again a suitable gas for the reduction step of the cycle. The gas which accumulates in the system due to removing oxygen from iron oxide is removed either as carbon monoxide or as carbon dioxide, preferably the former so as to thus obtain a gas of high calorific value; and such removal is made intermittently or continuously as may be required.

The hot material containing the reduced iron is subjected to a cooling step which avoids contact between air and the hot reduced iron, thus preventing substantial amounts of reoxidation, after which the somewhat cooled material, (e. g. a temperature below that at which oxygen of the air would readily reoxidize the reduced iron) is subjected to a magnetic treatment to separate the iron from the other materials. When this other material contains sufficient silica and alumina, its is advantageously mixed with the proper amount of calcareous material to prepare a raw mix suitable for being burned to produce cement. The heat content of such material is retained and made use of in the cement-burning step of the process. Such materials as the glauconite or greensands of New Jersey, etc. are thus indicated as being suitable raw materials for such combined operation, e. g. iron and cement from the same material, with the efficient utilization of heat units in the combined steps and using calcareous material to properly proportion the raw mix.

(A) $4Fe_2O_3 + 12C =$
$\qquad 4Fe_2 + 12CO - 432{,}480$ cal.
(B) $4Fe_2O_3 + 36CO =$
$\qquad 4Fe_2 + 24CO + 12CO_2 + 34{,}080$ cal.

These equations illustrate important differences between a reduction of iron oxide by carbon and a reduction thereof by carbon monoxide, Equation (A) being strongly endothermic and Equation (B) being exothermic. In effecting the reduction step, it is very advantageous to have an exothermic reaction so that there is sufficient heat energy available in sensible heats and heats of reaction to maintain the materials at sufficient temperature for the reduction to be carried forward without having to resort to heat applied externally, e. g. by electric means, etc. Also, the reducing gases do not require being preheated to a very high temperature so as to utilize their sensible heat for offsetting the endothermic value of other reactions, such as when hydrogen gas or solid carbon is used as the reducing agent. When hydrogen gas is used as the reducing agent, heat energy must be supplied to counteract the endothermic value of the reaction between iron oxide, e. g. $Fe_2O_3$, and hydrogen. Therefore in the present invention, the reducing gas is essentially CO, and preferably free from hydrogen and carbon dioxide, although the latter can be tolerated in small amounts such that the composition of the gas as regards CO permits the reduction taking place readily. The CO should be at least 1 part by volume for each volume of $CO_2$ and the higher its content the better the operation in the reducing step.

The hot gases, which contain an increased amount of $CO_2$ and a decreased amount of CO, due to the reduction step, are then passed into contact with highly heated carbon, preferably free from volatiles, and thus cause a reaction between $CO_2$ and C to yield some more CO. By suitably regulating this regeneration step, the $CO_2$ can be very materially reduced in amount and the CO materially increased. This increases the amount of gas over that originally present. The surplus CO may be removed, retaining in the system the required amount of hot CO for the reduction step.

A suitable container, in which carbon may be charged, e. g. certain types of modern water-gas generators, is given a heating-up treatment by high pressure blast of preheated air, sufficient to store up a large amount of sensible heat in the carbon, checkers, lining, etc. Then the gas connectors are changed so as to introduce some of the gas which is to be regenerated or discarded, preferably that portion of the gas which is to be removed from the cycle. By passing this portion of the gas through the retort, containing the heated carbon, the contained gases are quite well displaced so as to avoid excessive contamination of the reducing gases. Then, after such a purging treatment, the reducing gases with their contained $CO_2$ are regenerated by passing through this hot mass of carbon, and are thus available in their heated and modified condition for reducing some more iron oxide. These gases ordinarily are passed through the retort until the mass of carbon has cooled down to where $CO_2$ does not react with the carbon to form CO, and the gases actually used for the reduction of iron oxide are of fairly uniform temperature, i. e. above that required for effecting the reduction when the preheated ore is used.

Several water-gas generators or retorts may be used, and the gases from the cooler ones mixed with that from the hotter ones so that the mixed gas is fairly uniform and of a sufficient temperature when it comes into contact with the ore. The carbon used in these generators may be of any suitable kind, due consideration being given to the effect of impurities in the resulting gases on the iron or other products of the process. Wood charcoal may be used, at least to some extent. Coke which is obtained from good quality of bituminous coal may be used.

The heated products of combustion from the heating-up period are advantageously used in preheating the air which is used in the high-pressure blast into the generator, so as to economize in fuel, to obtain higher temperature within the retort, and care should be taken to have little if any CO in the gases or products of combustion leaving the retort on the heating-up step.

Suitable fans, blowers, heat exchangers, etc. may be used as found necessary or desirable for effecting the treatments. A non-oxidizing gas may be used for cooling the reduced iron product before discharging it into air, and this gas may be used to preheat or assist in preheating the iron ore charged, and reused in the cooling step, and this exchange of heat continued.

The invention may be further illustrated by the following descriptions, and by the accompanying diagrammatic flow sheet showing various steps and operations and pointing out various uses of different materials and various products which may be obtained as a result of the invention.

Suitable iron ore is fed into a preheater, then is preheated therein to a suitable temperature; from the preheater the hot ore passes into the reducer, wherein it is reduced by CO by an exothermic reaction; the reduced ore then passes into the cooler and is there cooled; from the cooler the mixture of reduced iron and gangue passes through a crusher to disintegrate the material further if needed; then it is screened; the screenings are subjected to magnetic treatment to separate the reduced iron from the fine particles of gangue; the iron may be used for a variety of purposes, e. g. in an open-hearth furnace to make steel, etc.; the fine particles of the gangue may be mixed with the coarse particles of gangue separated by the screening step, then suitably crushed, or ground and mixed with the required calcareous and other materials to prepare a suitable raw mix; the raw mix is passed into a cement kiln and therein burned to give a suitable clinker for cement manufacture.

The reducing gases are prepared from carbon. Coal may be destructively distilled to yield gases and carbon. The gases may be cooled to separate the volatile liquids from the non-condensed gases and the latter may be used for heating purposes. The heat required for the treatment of the coal may be obtained in any suitable manner. Hot products of combustion, or hot unburned gases may be brought into intimate contact with coal for the purpose. These hot gases may be passed through a porous mass of fine coal so as to facilitate the distillation and to facilitate transferring the heat to the coal particles. Other fuel, e. g. combustible gases from one or more steps of the process may be used to supply additional heat for the coal distillation step of the operations.

In the treatment of the iron ore, the following method of handling the gases is an advantageous one. The hot gases from the regenerator (advantageously carrying more $CO$ than $CO_2$) are passed through the preheater countercurrent to the iron ore in such manner that the iron ore (preferably free from water) is suitably preheated by these hot gases and the gases are suitably cooled.

The cooled gases pass from the preheater through a suitable fan or blower and then into the cooler and therein are heated by the hot reduced iron and gangue and the solids are cooled to a suitable point, e. g. so that they may be discharged into air without undergoing much if any reoxidation thereby. The reducing gases, e. g. containing a large percentage of $CO$, should then be hot enough for passing directly into the reducer wherein the $CO$ reduces iron oxide by an exothermic reaction. However, if these gases are not hot enough they may be removed, passed through a recuperator of the checker work type and their temperature raised to such a point that they may be then passed into the reducer. It is advantageous, however, to have these gases hot enough when leaving the cooler to go directly into the reducer. The heat contained in the reducer may be sufficient to raise these gases to the proper temperature, partly owing to the heat contained in the solids and partly due to the exothermic reactions occurring therein. The temperature within the reducer may be determined as required and either raised or lowered in any suitable manner as may be required for the steps.

The gases leaving the reducer contain more $CO_2$ than when they entered the reducer, and are hot. They are passed through e. g. a recuperator so adapted as to raise their temperature to a sufficient point for passing into the regenerator. The regenerator contains the highly heated carbon and in this occurs an endothermic reaction which draws upon the heat stored up in the gases as they come from the recuperator. The regenerator should be so run that the gases leaving it contain the desired amount and percentage of $CO$. As much of this regenerated gas as is required is then again passed into the preheater to again heat up some iron ore and be in turn somewhat cooled.

Suitable valve means are provided wherever required, as well as the necessary mechanical appliances. The iron ore which passes into the preheater, thence into the reducer and thence into the cooler and finally into the atmosphere, is caused to pass through suitable valve or other closure means which will permit the material to pass from device to device without coming into contact with air and so as to prevent substantial intermingling or short circuiting of gases from one device into one of another type. The hot finely divided material itself may be sufficient to prevent this, by keeping a sufficient amount of the material in the passageway between the different types of devices to act as a gas seal and yet permit the desired rate of passage from one device to another and finally into atmosphere. For example, these interconnecting passageways, for the solids, may be a vertical flue which has a hopper-like top and so arranged as to discharge onto a floor or hearth in the next lower device, the moving floor or hearth serving to keep the vertical flue filled or nearly filled with the fine solids to a depth of a few inches or feet and thus prevent gases passing through this vertical flue, and the moving floor or hearth serving to gradually draw solids therefrom while keeping the vertical flue closed in the manner indicated.

Some of the $CO$ gas, between the regenerator and the preheater, or some of the $CO$ and $CO_2$ gas, between the reducer and the recuperator, may be withdrawn as required owing to upbuilding of gas volume. The $CO$ gas may be used as such. The $CO$ and $CO_2$ gas may be used as such, or it may even be treated to remove $CO_2$ therefrom, e. g. by reacting with an oxide such as $CaO$ at a temperature below the dissociating temperature of its carbonate. The $CO$ gas may be used in internal combustion engines, or for producing hydrogen from steam, with subsequent removal of the $CO_2$ formed by this exothermic reaction below about 800 deg. C. The hydrogen may be purified as needed and used to produce $NH_3$.

The recuperator may be a checkerwork device in which fuel, e. g. the $CO$ from the process, or other suitable material is burned, advantageously using preheated air, and thus store up a large amount of heat in the refractories. In this recuperator, it is advantageous to have a large amount of checkerwork, and as small an amount of free space as feasible, and that the checkers be made of high grade refractories which absorb a large amount of heat readily and give it off readily, and stand a very high temperature, thus facilitating the storage of a large amount of heat in one burning, and by using preheated air and thus getting high flame temperatures, a large percentage of the total heat generated can be retained in the recuperator, although the products of combustion leave the recuperator, on the burning step, at around 600 to 800 deg. C. These hot products of combustion may be used for preheating the air used in the burning, and thus increase the amount and percentage of heat stored in the recuperator.

Where a "water-gas" generator is employed, it may serve both as regenerator and as recuperator. More checkerwork may be provided so as to facilitate storage of heat. By blowing preheated air at high velocity through the water-gas generator on the heating-up step, the large amount of carbon is heated to a high temperature. The gases contain little CO, most of the carbon being burned to $CO_2$ and if removed rapidly enough there is but little if any reversion to CO. The hot products of combustion may then be passed through checkerwork and store up some heat therein in addition to that stored in the carbon and refractories of the regenerator proper. As stated, the products of combustion should be purged before making use of the regenerator for the production of the gases which are to be used in the reduction of the iron ore. A portion of these $CO$—$CO_2$ gases may be used for the purging, and then removed from the cycle in a manner indicated above.

The regenerated gases from a plurality of regenerators, operating at different temperatures, are mixed before they are passed into the preheaters, or into the reducers. Some of the gases first coming from a very hot regenerator may be mixed with some cooler unregenerated gases and this mixture passed through a regenerator, thus making use of some of the heat stored up in the highly heated regenerated gases in a further regeneration.

Likewise the hot gases from the recuperators, when they are used in conjunction with regenerators, are mixed so that fairly uniform gases are passed through the regenerators. Or some of the cooler gases from the recuperators may be passed through the hotter regenerators, and some of the hotter gases from the recuperators passed though the cooler regenerators and their products mixed before passing to the preheaters or to the reducers. Some of the gases coming directly from the reducers, even if at fairly low temperature, may be passed through a very hot regenerator; or if the gases from the reducer are quite hot, they may be passed directly through a regenerator. In all cases, there must be sufficient heat available to permit of carrying out the desired conversion of $CO_2$ to CO. Where only a partial conversion is desired, and a relatively large volume of gas is used in the cycle, the amount of heat energy stored up in the excess quantity of gas circulated assists in transferring the heat energy necessary without having excessive temperatures at any point in the system, and the operations are made more uniform, which is an advantage.

The process provides a novel cycle and a novel means of utilizing as well as supplying or transferring the heat energy necessary in the operation of the steps of the process, so that a small amount of reducing agent is required. Excessive gas temperatures are made unnecessary by the steps of the invention and the exothermic and the endothermic reactions are carried out in an advantageous manner. Heat energy is utilized to good advantage; various products are made available; and the substantially full utilization of the solids as well as the gases is made possible by this process; various so-called low-grade iron ores are thus rendered available thereby.

Where substantially pure oxygen gas is available, it may be mixed with $CO_2$ gas in proper ratio and this mixture used for converting carbon into CO. The endothermic reaction of $CO_2$ on C can be utilized in holding down the temperatures to a suitable point, and the net heat generated can be utilized in converting $CO_2$ into CO. The temperature can be controlled by added $CO_2$ gas. The gas removed from the cycle, which is high in CO, may be used in preheating the ore, at least in part, and it may be used to assist in heating up the carbon in the retort, or in a recuperative stove provided with checkerwork, or it may be used to produce steam and thus power for the operations, or it may be cooled down and used, after scrubbing if needed, in internal combustion engines and thus obtain power required to drive the fans, blowers, and other suitable equipment required to operate the various steps of the process. Where the separated iron is placed in open hearth or other suitable furnaces and melted, the use of this CO gas may be resorted to, for which it is particularly advantageous owing to its high calorific value. Where the separated material is made into cement, some of this CO-containing gas may be used in the burning step in which cement is made. The amount of such gas required is somewhat less when the material is separated from the iron while fairly hot and retains some of its sensible heat when charged into the cement burning kiln.

In obtaining coke from bituminous coal, or in the destructive distillation of wood, or a mixture of wood and coal, some of the hot gases from this process, e. g. those which are to be discarded, containing CO, may be used to heat the material and thus effect the decomposition. The sensible heat contained in the discarded gases is thus utilized in producing one of the raw materials of the process in an advantageous manner. The hot gases from the destructive distillation treatment, which may even include some gases resulting from so-called low-temperature carbonization, may be cooled to condense volatile liquids and thus recover these values, while the cooled non-condensed gases are utilized in other ways, such, for example, as those outlined above. Water, hydrocarbons, etc. should be removed with substantial completness before the carbon is used in the water-gas generator. This retort, sometimes called water-gas generator, is not employed for the production of water gas in this process, but the gas passed through the retort is of a special kind, and hydrogen is kept low in amount or is excluded altogether.

An alternative method for furnishing the heat energy needed to permit the reaction $CO_2 + C = 2CO - 38,880$ calories to be carried out in order to regenerate the reducing gases, is to burn fuel in a regenerative stove of rather large size which contains a large number of checker brick, thus heating up the bricks, etc., to a high temperature, e. g. 1500 to 1800 deg. C., utilizing the products of combustion, principally $CO_2$ and nitrogen, for preheating the air which is used in such heating-up step, thus saving heat units, getting a higher temperature in the stove and storing a large percentage of the heat generated in the stove to be later picked up by the mixture of CO and $CO_2$. The products of combustion may leave the stove at around 900 deg. C. or considerably lower temperature. When the hot gases, CO and $CO_2$, come from the reduction step at around 900 to 1,000 deg. C., they may be somewhat cooled before they reach the fan or other apparatus by which the gases are caused to circulate through the regenerator and through the apparatus containing the iron ore which is to be reduced, and through the recuperative stove in case one is employed. Such cooling prior to reaching the fan facilitates the operations, e. g. by permitting lower temperatures at the fan. This reduction in heat can be made up by the heat which is stored in the recuperative stoves, so that the mixture of $CO_2$ and CO gases are brought up to a high temperature, e. g. around 1300 to 1600 deg. C and then passed into contact with heated carbon to effect the converson of $CO_2$ to CO, the sensible heat in the gases being sufficient to compensate for the heat energy absorbed in the endothermic reaction involved. When the gases are preheated in this manner, the fan is advantageously placed in the cooler position, and if required, a portion of the gases may be withdrawn and passed through a fan or blower and reintroduced into the flue in such manner and under such velocity that the main body of gases is caused to circulate through the flues and apparatus. The smaller portion of gases withdrawn may be somewhat cooled before passing through the fan, thus cooling only a portion of the hot gases and yet being able to circulate the entire volume of gases.

Where the heat units required for the endothermic reaction of $CO_2$ and C to 2CO are obtained from the sensible heat of the mixed gases, it is not essential to use a water-gas retort or generator for preheating carbon, since the carbon may be kept at a suitable temperature by the sensible heat of the highly heated mixed gases, and thus gases can be passed through the retort continuously. This avoids the purging treatment to eliminate the hydrogen, nitrogen, water vapor, etc., and is otherwise advantageous, although it requires extra apparatus. The heat units which are picked up in the recuperator by the mixed $CO_2$ and CO gases, can be previously stored therein by a burning treatment in which producer gas, by-product coke gas, carbon monoxide gas, water gas, oil, etc., are burned with preheated air in such manner as to store up a large percentage of the heat generated during the combustion of the fuel to $CO_2$, etc.

Another alternative method of providing the heat units for the endothermic reaction involved in the conversion of $CO_2$ into CO by contact with hot carbon, is to mix with the carbon, e. g. fairly finely divided, an inert material, for example, calcium oxide, which does not readily fuse under the conditions existing when highly heated, then to subject the mixture of carbon and the large amount of inert material to a heating step to store up a considerable number of heat units by burning fuel in such a manner that the material is highly heated with products of combustion or heat developed during the burning of the fuel principally to $CO_2$ (e. g. when coal is used), then passing this highly heated mixture of carbon and inert material, substantially free from contained gases, into another chamber of the apparatus and therein subject it to the action of the mixture of carbon monoxide and carbon dioxide to form more CO. When the inert material has thus been somewhat cooled, it may be removed from the regeneration chamber into another heating chamber and there have more heat units stored up in it and then again passed into the regeneration chamber, and so on. In this manner, the inert material is utilized for storing up a large amount of heat which is then carried into the regeneration chamber wherein such heat is utilized to offset the heat absorbed in the endothermic reaction; and then the inert material and remaining contained carbon is again heated to store up heat units and later used in another regeneration step. By superimposing these chambers, one above the other, and providing means for transferring the inert material and carbon from one chamber to the other without carrying much gas from one chamber to the other, and by spreading out the inert material and carbon to present large surface exposed to the gases and obtaining good contact, and by utilizing the gases in the respective stages for use in another chamber of a similar type, a considerable degree of heat utilization is effected, care being taken to keep sufficient oxygen present in the heating chambers in any suitable manner to get a good heat generation by burning carbon principally to $CO_2$, even if oxygen (e. g. in the form of air) has to be introduced in various portions thereof.

The heating of the carbon and inert material, as well as the regeneration step (i. e. $CO_2$ and C into 2CO) may be carried out in their respective chambers, and these respective chambers may be connected in parallel or in series or in series-parallel, in order to make effective utilization of the heat units. The air used in the burning or heating step should be preheated by the products of combustion in order to economize in fuel. The fuel may be gaseous, and advantageously some of the CO which is produced in the process.

When the inert material has been treated so that most of its carbon has been converted into CO by reaction with $CO_2$, it may be removed from the last regeneration chamber and mixed in its hot condition with some fine particles of coal, and thus utilize the heat stored up in the inert material for the destructive distillation of the coal to give valuable products, including gas, and leave coke or other carbonaceous material with the lime or other inert material. This mixture of inert material and carbon may then be transferred in its hot condition to one of the heating chambers to therein store up some more heat units for use in a later regeneration chamber, and the process then becomes of a cyclic character. Impurities from the coal or coke will increase somewhat and may tend to produce a more easily fusing product at the high temperatures reached when storing up heat units. In order to avoid this, some of the inert material may be removed so as to limit such upbuilding and additional amount of fresh inert material supplied, previously heated to a desirable temperature so as to economize in heat. The discarded inert material, e. g. lime and some ash from coke, may be admixed with some of the materials separated from the reduced iron by the magnetic treatment and the mixture burned so as to produce cement. The heat units in the discarded material reduce the total amount required for the cement burning and is thus advantageous utilization of both discarded products.

Some of the preheating of the iron ore may be carried out with some of the hot products of combustion of the process. Heat units utilization is one object of the invention described.

It will thus be seen that the present invention provides for the reduction of iron oxides contained in certain types of iron ores by reaction of carbon monoxide on the iron oxide, so that the reaction is of an exothermic character thus facilitating the reduction treatment; that the iron ore is preheated prior to the reduction step, utilizing heat units in the process; that the reduced iron products are cooled prior to mixing them with air; that the reduced iron is separated magnetically from the other materials; that such separated materials may be used in the formation of cement; that carbon monoxide gas of high calorific value may be produced and recovered for various uses; that a novel method of regenerating the reducing gas is described, together with various ways of providing the heat units required by the endothermic reaction involved; that a novel method is provided for the destructive distillation of coal, so that the gases may be removed and cooled to condense volatile liquids and leave the combustible gas for utilization as desired. Other objects, results and methods have been described and advantages disclosed.

The iron ore may be given a preheating treatment in a multiple hearth furnace, such as a Wedge furnace, then passed into a reduction furnace, which may be placed beneath the heating furnace, of a similar construction, and therein treated by the hot CO gases to reduce iron oxide into iron, and the material then passed into a lower furnace of similar design and therein cooled somewhat with non-oxidizing gases, and later discharged into the atmosphere and subjected to a magnetic separation. Arrangements are provided to prevent interchange of gases between the three sections or three separate furnaces, except the gases used for cooling the product may be used for the preheating treatment, at least in part, and then returned to the cooling furnace. The more cooling done, the more heat units which can be transferred to the material in the preheating section or furnace. Additional heating may be provided in any suitable manner. Finely divided iron ores may be thus treated.

I claim:

1. The method of converting carbon dioxide into carbon monoxide, which comprises subjecting a mixture of inert material and carbon to a heating treatment to store up heat energy therein, purging the heated mixture from gaseous products of combustion and bringing gases containing carbon dioxide into intimate contact with such heated mixture to convert carbon dioxide into carbon monoxide.

2. In the art of treating iron ores, the steps which include preheating iron ore by a stream of hot gases containing carbon monoxide and a lesser amount of carbon dioxide, passing the cooled gases in substantially unchanged chemical condition into intimate contact with a mixture of reduced iron and gangue previously heated in the reducing step, to cool the reduced iron and gangue, then passing the hot gases containing the carbon monoxide into intimate contact with preheated iron ore to effect a reduction of the iron oxide by the carbon monoxide, then passing the hot gases which contain an increased amount of carbon dioxide into contact with hot carbon to convert carbon dioxide into carbon monoxide and again passing the hot gases thus regenerated into intimate contact with iron ore, substantially as described.

3. The improvement in claim 2, which comprises subjecting the cooled solids to a magnetic separation treatment to separate reduced iron from gangue, mixing calcareous material with the gangue and preparing a raw-mix, and burning the raw-mix to make cement clinker, burning some of the combustible gas after it has been used in the reduction step of the iron ore treatment, such gas containing carbon monoxide and carbon dioxide to generate heat for utilization in the burning step of the cement clinkering.

4. The method of producing carbon monoxide, which comprises subjecting a mixture comprising carbon and an inert material to combustion until the mixture is heated to a temperature adapted to decompose carbon dioxide, and passing a gas containing carbon dioxide, substantially free from nitrogen, into contact with the heated mixture, whereby said carbon dioxide is converted into carbon monoxide.

5. The method of converting carbon dioxide into carbon monoxide, which comprises subjecting a mixture comprising inert material and carbon alternately to combustion to store up heat energy therein and to a treatment with material comprising carbon dioxide whereby carbon monoxide is produced and some of the stored heat energy is utilized; and utilizing the hot inert material, remaining after some of the carbon has been consumed, by mixing it with coal, whereby volatile constituents of the coal are driven off and a mixture comprising carbon and inert material is produced suitable for use in further carrying out of the process.

6. The method of reducing an oxide of a metal, which comprises forming a reducing gas while at a high temperature treatment, passing the reducing gas while at a high temperature into counter-current contact with a metallic oxide to be reduced, whereby to heat the metallic oxide to a temperature sufficient for initiating the reducing treatment and simultaneously to cool the resulting gas, passing such cooled gas counter-currently into contact with hot reduced metal-bearing material until such reduced material is cooled to a point where it can be safely advanced to other operations, and passing the reducing gas thus heated into a reducing zone and counter-currently into contact with a metallic oxide which is being reduced.

7. The process according to claim 6, in which the reducing gas contains carbon monoxide and resulting hot gases from the reducing zone are passed without substantial loss of heat to a regenerator in which carbon dioxide is converted to carbon monoxide by contact with highly heated carbon, and hot carbon monoxide, thus formed, is used in repeating the cycle.

8. The method of reducing iron ore which contains an oxide of iron, which comprises forming a reducing gas including carbon monoxide by a high temperature treatment; counter-currently passing the carbon monoxide, while still at a high temperature, into contact with the metallic oxide to be reduced, whereby to heat the raw material to a temperature sufficient for initiating the reducing reaction and simultaneously to cool the gas; passing such cooled gas into contact with hot reduced metal until such metal is cooled to a point at which reoxidation thereof when brought into contact with ordinary air will be substantially prevented; passing the mixture of carbon dioxide and carbon monoxide from the reducing zone without substantial cooling thereof into contact with highly heated carbon, whereby to reconvert carbon dioxide into carbon monoxide; and utilizing hot concentrated carbon monoxide thus regenerated for further repetition of the cycle and passing the reducing gas thus heated into the reducing zone and into contact with the iron oxide which is being reduced.

9. The method of reducing iron oxide, which comprises preheating finely divided iron ore substantially to a temperature at which reduction by carbon monoxide will take place, preheating carbon monoxide to near the temperature of the reducing reaction by passing relatively cool reducing gas including carbon monoxide counter-current to hot finely divided solids including metallic iron derived from iron oxide by a reducing step of the process, introducing the heated gas into contact with the heated oxide and maintaining the temperature in the reaction zone by means of the exothermic reaction between carbon monoxide and the iron oxide.

10. The process for producing cement from iron ore, which comprises forming a material containing calcareous, siliceous and aluminous constituents by mixing calcareous material with coke, utilizing the mixture in a carbon monoxide producer where the calcareous material serves as a heat retaining material and the coke as a source of carbon, intermittently burning the coke to store up heat therein and in the calcareous material and between such burning steps passing gases including carbon dioxide into contact with the hot mixture so as to convert carbon dioxide into carbon monoxide, utilizing hot concentrated carbon monoxide thus formed for reducing an iron ore containing siliceous matter, coverting carbon dioxide resulting from such reduction into carbon monoxide by treatment in a carbon monoxide producer, reusing hot calcareous material in such a producer by mixing with additional coke and utilizing the resulting mixture of coke and calcareous material for reducing carbon dioxide to carbon monoxide, separating reduced iron from non-ferrous constituents, mixing the latter with the calcareous mixture obtained from the producer and treating the resulting mixture to produce cement therefrom, utilizing some of the heat energy available from prior steps of the process.

11. The method of treating solids including an oxide of iron, which comprises the following steps:—(a) passing such solids in finely divided state countercurrent to hot gases under conditions adapted to bring the solids up to a temperature sufficient to effect chemical reduction of an oxide of iron by means of carbon monoxide; (b) passing the preheated solids in finely divided state countercurrent to hot reducing gases containing carbon monoxide as the main reducing agent so as to effect such a reduction and obtain metallic iron; (c) passing hot gases from step (b), these gases containing carbon monoxide and carbon dioxide, into intimate contact with hot solids including carbon so as to convert carbon dioxide thereof into carbon monoxide; (d) burning fuel and utilizing heat thereby generated to heat carbon utilized in step (c); (e) cooling hot reducing gases produced by steps (c); (f) passing the cooled reducing gases including carbon monoxide countercurrent to the hot solids including iron from step (b); and utilizing the heated gases from step (f) to reduce an oxide of iron in step (b).

12. The process for treating finely divided iron ore that contains an oxide of iron, which comprises the following steps:—(a) pretreating the finely divided iron ore by passing the ore countercurrent to hot gases containing carbon monoxide, and removing from the treated ore the resulting gases containing residual carbon monoxide; (b) passing hot gases containing carbon dioxide and carbon monoxide into intimate contact with hot carbon, so as to convert the carbon dioxide into carbon monoxide; (c) cooling carbon monoxide obtained by step (b), and passing the cooled gases countercurrent to solids including metallic iron obtained by step (d), so as to cool the iron to a point below that at which it will readily oxidize when brought into contact with ordinary air, and preheating the gases up to a temperature at which carbon monoxide is capable of reducing FeO to Fe; (d) passing preheated ore from step (a) countercurrent to hot reducing gases of which carbon monoxide is the primary reducing agent, so as to reduce FeO to Fe and convert a portion only of the CO into $CO_2$; and (e) removing hot gases, including CO and $CO_2$ resulting from step (d), from treated iron ore and treating them by step (b), and burning fuel by means of air to supply heat to the carbon.

In testimony whereof I affix my signature.
LINN BRADLEY.